US009529654B2

(12) United States Patent
Kwon et al.

(10) Patent No.: US 9,529,654 B2
(45) Date of Patent: Dec. 27, 2016

(54) RECOVERABLE AND FAULT-TOLERANT CPU CORE AND CONTROL METHOD THEREOF

(71) Applicant: ELECTRONICS AND TELECOMMUNICATIONS RESEARCH INSTITUTE, Daejeon (KR)

(72) Inventors: Young Su Kwon, Daejeon (KR); Jin Ho Han, Seoul (KR); Kyung Jin Byun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 171 days.

(21) Appl. No.: 14/547,301

(22) Filed: Nov. 19, 2014

(65) Prior Publication Data
US 2015/0149836 A1    May 28, 2015

(30) Foreign Application Priority Data

Nov. 27, 2013  (KR) .................. 10-2013-0145319
Jun. 10, 2014   (KR) .................. 10-2014-0069937

(51) Int. Cl.
  *G06F 11/00*   (2006.01)
  *G06F 11/07*   (2006.01)
  *G06F 11/18*   (2006.01)

(52) U.S. Cl.
  CPC ....... *G06F 11/0772* (2013.01); *G06F 11/0721* (2013.01); *G06F 11/183* (2013.01)

(58) Field of Classification Search
  CPC .............. G06F 11/0721; G06F 11/1405; G06F 11/1633; G06F 11/183; G06F 11/184; G06F 11/187
  USPC ...................................... 714/10, 11
  See application file for complete search history.

(56) References Cited

U.S. PATENT DOCUMENTS

| | | | |
|---|---|---|---|
| 6,751,749 B2* | 6/2004 | Hofstee | G06F 9/30116 712/228 |
| 7,117,389 B2* | 10/2006 | Luick | G06F 11/2028 714/10 |
| 7,146,530 B2 | 12/2006 | Pomaranski et al. | |
| 7,206,966 B2 | 4/2007 | Barr et al. | |
| 7,698,594 B2* | 4/2010 | Aizawa | G06F 11/142 714/10 |

(Continued)

OTHER PUBLICATIONS

Wetsel et al.; "PowerPC User Instruction Set Architecture;" Book I; Version 2.01; Sep. 2003; p. 49.*

*Primary Examiner* — Joseph Kudirka
(74) *Attorney, Agent, or Firm* — LRK Patent Law Firm

(57) ABSTRACT

A recoverable and fault-tolerant CPU core and a control method thereof are provided. The recoverable and fault-tolerant CPU core includes first, second, and third arithmetic logic circuits configured to perform a calculation requested by the same instruction, a first selector configured to compare calculation values output from the first, second, and third arithmetic logic circuits by the same instruction, determine as a normal state when two or more of the calculation values are the same, and if not, determine as a fault state, and a register file configured to record the calculation value having the same value, when determining as the normal state in the first selector.

14 Claims, 4 Drawing Sheets

(56) References Cited

U.S. PATENT DOCUMENTS

| | | | |
|---|---|---|---|
| 7,865,769 B2* | 1/2011 | Luick | G06F 9/30101 |
| | | | 712/216 |
| 8,412,980 B2* | 4/2013 | Hickey | G06F 11/1641 |
| | | | 712/215 |
| 2004/0153747 A1* | 8/2004 | Czajkowski | G06F 11/1479 |
| | | | 714/10 |
| 2013/0061090 A1 | 3/2013 | Lee | |

* cited by examiner

RECOVERABLE AND FAULT-TOLERANT CPU CORE AND CONTROL METHOD THEREOF

CROSS-REFERENCE TO RELATED APPLICATION

This application claims priority to and the benefit of Korean Patent Application No. 10-2013-0145319, filed on November 27, AND 10-2014-0069937, filed on Jun. 10, 2014, the disclosure of which is incorporated herein by reference in its entirety.

BACKGROUND

1. Field of the Invention

The present invention relates to a central processing unit (CPU) core, and more particularly, to a recoverable and fault-tolerant CPU core and a control method thereof.

2. Discussion of Related Art

A central processing unit (CPU) core means hardware which reads an instruction stored in a memory or a disk, performs a specific calculation on operands according to an operation encoded in the instruction, and executes an algorithm for a specific application by storing the calculated result again.

The CPU core is widely being applied to every field of a system semiconductor. For example, the CUP core may be applied to media data processing for massive multi-media data such as video data compression and decompression, audio data compression and decompression, and audio data conversion, and sound effects. Further, the CPU core is extensively applied to network data processing, a touch screen, a controller for home appliances, a minimum performance microcontroller platform such as a motor control, a wireless sensor network, and microelectronics.

The CPU core includes a core, a translation lookaside buffer (TLB), and a cache, A job performed by the CPU core is prescribed by a combination of a plurality of instructions. Instructions stored in the memory are sequentially input to the CPU core, and the CPU core performs a calculation corresponding to the input instructions every clock cycle.

The TLB performs a function of converting a virtual address into a physical address for driving an operating system-based application, and the cache temporarily stores the instruction stored in an external memory, and thus a speed of the CPU core may be increased.

Meanwhile, development of a driver assistance system such as an advanced driver assistance system (ADAS) is actively being performed in recent automobile electronics fields. Specifically, in order to implement an apparatus for recognizing an external environment of an automobile instead of a driver, a possibility in which a high performance CPU core using a clock having a frequency which is equal to or more than 500 MHz is used is high. Here, the recognition of the external environment of the automobile may include motion detection, pedestrian recognition, driving pattern or drowsiness recognition, driving assistance through lane detection.

In order to improve recognition performance of the external environment, reliability of the CPU core should be ensured. That is, the CPU core used in the automobile electronics field has a main function of recognizing when the CPU core does not normally operate.

For example, in an application which directly controls an automobile steering device by recognizing data outside the automobile, reliability of the CPU core is very important. This is because reliability of the CPU core has a direct influence on a life of the driver when the CPU core abnormally operates due to factors such as voltage, current, temperature, etc.

SUMMARY OF THE INVENTION

The present invention is directed to a central processing unit (CPU) core including a multi-path update register file and a state recovery structure, and a control method thereof.

According to one aspect of the present invention, there is provided a recoverable and fault-tolerant CPU core, including: first, second, and third arithmetic logic circuits configured to perform a calculation requested by the same instruction; a first selector configured to compare calculation values output from the first, second, and third arithmetic logic circuits by the same instruction, determine as a normal state when two or more of the calculation values are the same, and if not, determine as a fault state; and a register file configured to record the calculation value having the same value, when determining as the normal state in the first selector.

According to another aspect of the present invention, there is provided a control method of a CPU core including first, second, and third arithmetic logic circuits, a register file, and a first selector configured to compare calculation values output by the same instruction from the first, second, and third arithmetic logic circuits, including: comparing the calculation values output by the same instruction from the first, second, and third arithmetic logic circuits, determining as a normal state when two or more of the calculation values are the same, and if not, determining as a fault state; and recording the calculation value having the same value in the register file, when determining as the normal state.

According to still another aspect of the present invention, there is provided a control method of a CPU core including first, second, and third arithmetic logic circuits, a register file, and a second selector configured to compare control signals output from the first, second, and third arithmetic logic circuits, including: comparing the control signals output from the first, second, and third arithmetic logic circuits, determining as a normal state when two or more of the control signals are the same, and if not, determining as a fault state; and reading a register value from the register file according to the control signal having the same value in the register file, when determining as the normal state.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

These inventive concepts may be embodied in different forms and should not be construed as limited to the embodiments set forth herein. Example embodiments of the present invention are described below in sufficient detail to enable those of ordinary skill in the art to embody and practice the present invention, and the present invention is defined in the claims and their equivalents. Meanwhile, terminology used herein to describe embodiments of the invention is not intended to limit the scope of the invention. The articles "a," "an," and "the" are singular in that they have a single referent, but the use of the singular form in the present description should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Hereinafter, exemplary embodiments of the present invention will be described in detail below with reference to the accompanying drawings. First of all, when giving numerals to components of each drawing, although there is the same component in other drawing, the same numeral is given. Further, when a detailed description of known functions or configurations related to the present invention unnecessarily obscures the gist of the present invention, a detailed description thereof will be omitted.

Figure 1:
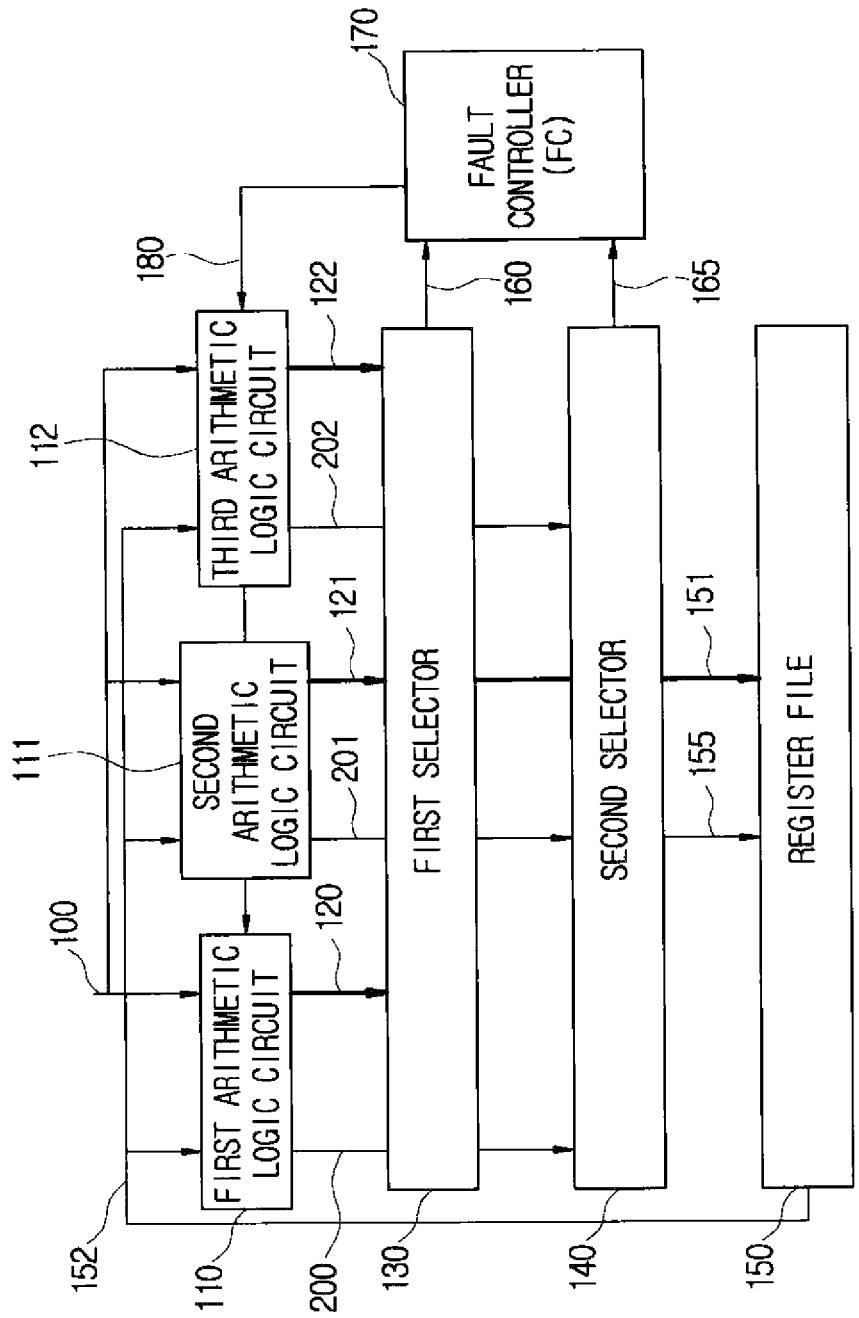
FIG. 1 is a diagram illustrating an internal construction of a recoverable and fault-tolerant central processing unit (CPU) core according to an embodiment of the present invention.

FIG. 1 is a diagram illustrating an internal construction of a recoverable and fault-tolerant central processing unit (CPU) core according to an embodiment of the present invention.

Referring to FIG. 1, the recoverable and fault-tolerant CPU core according to an embodiment of the present invention may include first to third arithmetic logic circuits 110, 111, and 112, first and second selectors 130 and 140, a register file 150, and a fault controller 170.

The first to third arithmetic logic circuits 110, 111, and 112 may read an instruction stored in a cache, and perform a calculation according to the instruction. As one example, the first to third arithmetic logic circuits 110, 111, and 112 may output a basic calculation result by performing a basic calculation (addition, multiplication, comparison, fraction, floor, etc.) on input data. Further, the first to third arithmetic logic circuits 110, 111, and 112 may output a multiplication calculation result by performing the multiplication calculation for calculating a cross product.

As another example, the first to third arithmetic logic circuits 110, 111, and 112 may perform a dot product calculation and a cross product calculation.

The first to third arithmetic logic circuits 110, 111, and 112 may have the same logic for performing a calculation requested by the same instruction. In order to implement the same logic, each of the first to third arithmetic logic circuits 110, 111, and 112 may be designed to have the same construction in a transistor level, but it may be desirable to design to have a different construction in the transistor level by differently doing a synthesis of logics.

Meanwhile, each of the first to third arithmetic logic circuits 110, 111, and 112 may have a multi-step pipeline, and perform a calculation requested by the same instruction 100 by the multi-step pipeline. For example, in a "register read operation", a register value may be read from the register file 150 by an internal pipeline, and in a "register write operation", a calculation value may be updated in the register file 150 by the internal pipeline. The recoverable and fault-tolerant CPU core according to an embodiment of the present invention may include the respective selectors 130 and 140 for determining a malfunction of the first to third arithmetic logic circuits 110, 111, and 112 in the register write operation and the register read operation.

Hereinafter, in the register write operation and the register read operation, a method in which the selectors 130 and 140 process outputs of the first to third arithmetic logic circuits 110, 111, and 112 will be described.

Register Write Operation

The first to third arithmetic logic circuits 110, 111, and 112 may receive the same instruction 100 from an instruction cache. The first to third arithmetic logic circuits 110, 111, and 112 may perform a calculation requested by the same instruction, and output calculation values 120, 121, and 122, respectively, as a result.

The first to third arithmetic logic circuits 110, 111, and 112 may be connected with the first selector 130 through an update bus, and the three calculation values 120, 121, and 122 may be transmitted to the first selector 130 through the update bus.

The first selector 130 may select the calculation value equal to at least another one among the calculation values 120, 121, and 122 output from the first to third arithmetic logic circuits 110, 111, and 112. A two-out-of-three vote operation may be performed at each decision point of the first to third arithmetic logic circuits 110, 111, and 112 which are independently connected in parallel, and thus it may be determined whether the CPU core has a fault.

According to an embodiment of the present invention, the first selector 130 may compare the calculation values 120, 121, and 122 output from the first to third arithmetic logic circuits 110, 111, and 112, and the first selector 130 may determine that the CPU core is in a normal state when two or more of the calculation values are the same, and if not, the first selector 130 may determine that the CPU core is in a fault state.

The first selector 130 may update a calculation value 151 having the same value in the register file 150 when determining that the CPU core is in the normal state. The first selector 130 may be connected with the register file 150 through the update bus, and the same calculation value 151 may be transmitted to the first selector 130 through the update bus.

Register Read Operation

In order to read the register value stored in the register file 150, the first to third arithmetic logic circuits 110, 111, and 112 may output control signals 200, 201, and 202 designating an address of the register values to be read. At this time, the control signals 200, 201, and 202 may include information designating the same address to be read in the register file 150.

The control signals 200, 201, and 202 may be transmitted to the second selector 140 through an internal bus, the second selector 140 may select a control signal equal to at least another one among the control signals 200, 201, and 202.

According to an embodiment of the present invention, the second selector 140 may compare the control signals 200, 201, and 202, and the second selector 140 may determine that the CPU core is in a normal state when two or more of the control signals are the same, and if not, the second selector 140 may determine that the CPU core is in a fault state.

The second selector 140 may output a control signal 155 having the same value to the register file 150 when determining that the CPU core is in the normal state. The register file 150 may read a register value 152 according to the control signal 155, and provide the read value to the first to third arithmetic logic circuits 110, 111, and 112.

Meanwhile, the first and second selectors 130 and 140 may determine that the CPU core is in the fault state when there is no same value or signal among the calculation values or the control signals output from the first to third arithmetic logic circuits 110, 111, and 112. In this case, the first and second selectors 130 and 140 may transmit information 160 and 165 indicating that the CPU core is in the fault state to the fault controller 170.

When receiving the information 160 and 165 indicating that the CPU core is in the fault state, the fault controller 170 may control each of the first to third arithmetic logic circuits 110, 111, and 112 to perform a micro flush operation. When determining that the CPU core is in the fault state, the micro flush operation performed by the first to third arithmetic logic circuits 110, 111, and 112 will be described hereinafter with reference to FIG. 2.

The register file 150 may include a register storing data (for example, constant data, intermediate operation results, address data, etc.) for performing a calculation, and a register storing the calculation values (for example, calculation values, address data, etc. output from the first selector) output from the first to third arithmetic logic circuits 110, 111, and 112.

Figure 2:
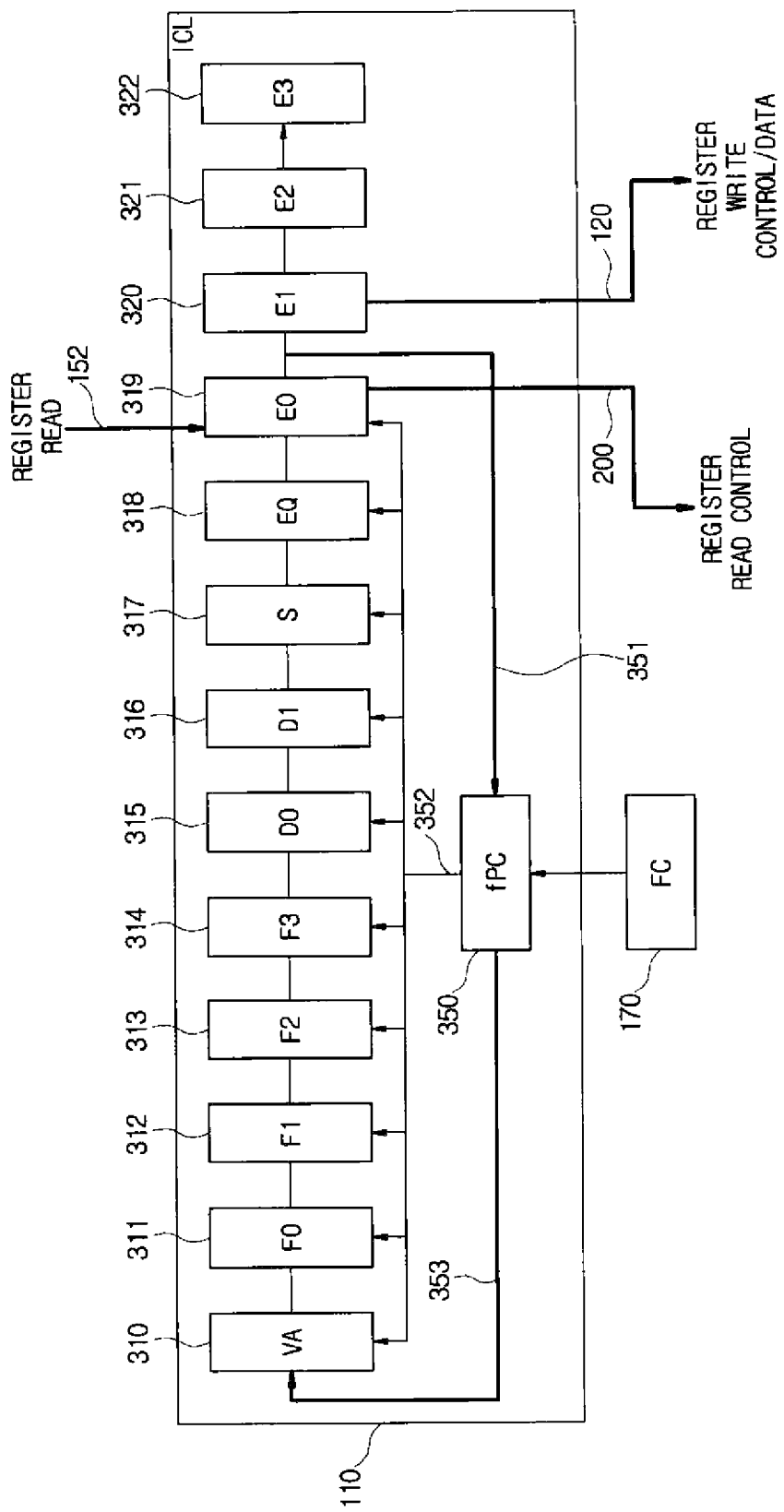
FIG. 2 is a diagram illustrating an internal construction of each of first to third arithmetic logic circuits shown in FIG. 1.

FIG. 2 is a diagram illustrating an internal construction of each of first to third arithmetic logic circuits shown in FIG. 1.

As described above, in an embodiment of the present invention, the first to third arithmetic logic circuits 110, 111, and 112 may have a multi-step pipeline structure for performing a calculation requested by the same instruction. In FIG. 2, an internal pipeline structure of the first arithmetic logic circuit 110 is exemplarily illustrated.

Referring to FIG. 2, the first arithmetic logic circuit 110 may include an virtual address access unit 310, fetch and branch prediction units 311 and 312, a branch instruction analysis unit 313, an instruction queue unit 314, decoders 315 and 316, a scheduler 317, an execution queue unit 318, a register operand fetch unit 319, and first to third execution units 320, 321, and 322, which are sequentially connected and have a pipeline structure.

Here, instructions including execution codes and operands for performing a calculation requested by the instructions may be sequentially output through the instruction access unit 310, the fetch and branch prediction units 311 and 312, the branch instruction analysis unit 313, and the instruction queue unit 314.

The decoders 315 and 316 may decode the input instruction into a machine language. The instruction may have a certain grammatical structure, and read a value stored in a register designated by a source operand.

The register operand fetch unit 319 may have a register read function. That is, the register operand fetch unit 319 may output the control signal 200 designating an address of a register value to be read, and fetch the register value 152 from the register file 150.

The first to third execution units 320, 321, and 322 may perform a calculation requested by the instruction using the data, etc. decoded, for example, an execution code converted into the machine language, by the decoders 315 and 316, For example, the execution units may be configured by three stages, and the calculation may be sequentially performed at each stage, and the calculation result 120 may be output from each stage.

Meanwhile, according to an embodiment of the present invention, the first arithmetic logic circuit 110 may further include a program counter controller 350.

When the information 160 and 165 indicating that the CPU core is in the fault state are transmitted from the first and second selectors 130 and 140 to the fault controller 170, the fault controller 170 may transmit a control signal for performing the micro flush operation to the program counter controller 350.

At this time, the program counter controller 350 may read a program counter value 351 generated by executing until a current clock cycle from the first execution unit 320, and store the read program counter value. Further, the program counter controller 350 may transmit a flush signal 352 to each component of the pipeline structure in front of the first execution unit 320, and terminate an execution of every instruction after the program counter value stored in the program counter controller 350. This may be referred to as the micro flush operation.

Meanwhile, when the micro flush operation is completed, the program counter controller 350 may provide the program counter value to the instruction access unit 310, and may control the instruction access unit 310 to read an instruction again from the program counter value when a fault is generated.

As such, the CPU core according to an embodiment of the present invention may perform the micro flush operation, and terminate the execution of the instruction in which the fault is generated and the execution of the instruction after the fault is generated. After this, the CPU core may return to a state when the fault is generated, and resume an operation while reading from the instruction when the fault is generated. Accordingly, when the fault is generated, since the number of clock cycles consumed until returning to a normal state may be decreased compared with a conventional CPU core resetting every program which is being executed, availability may be increased.

Figure 3:
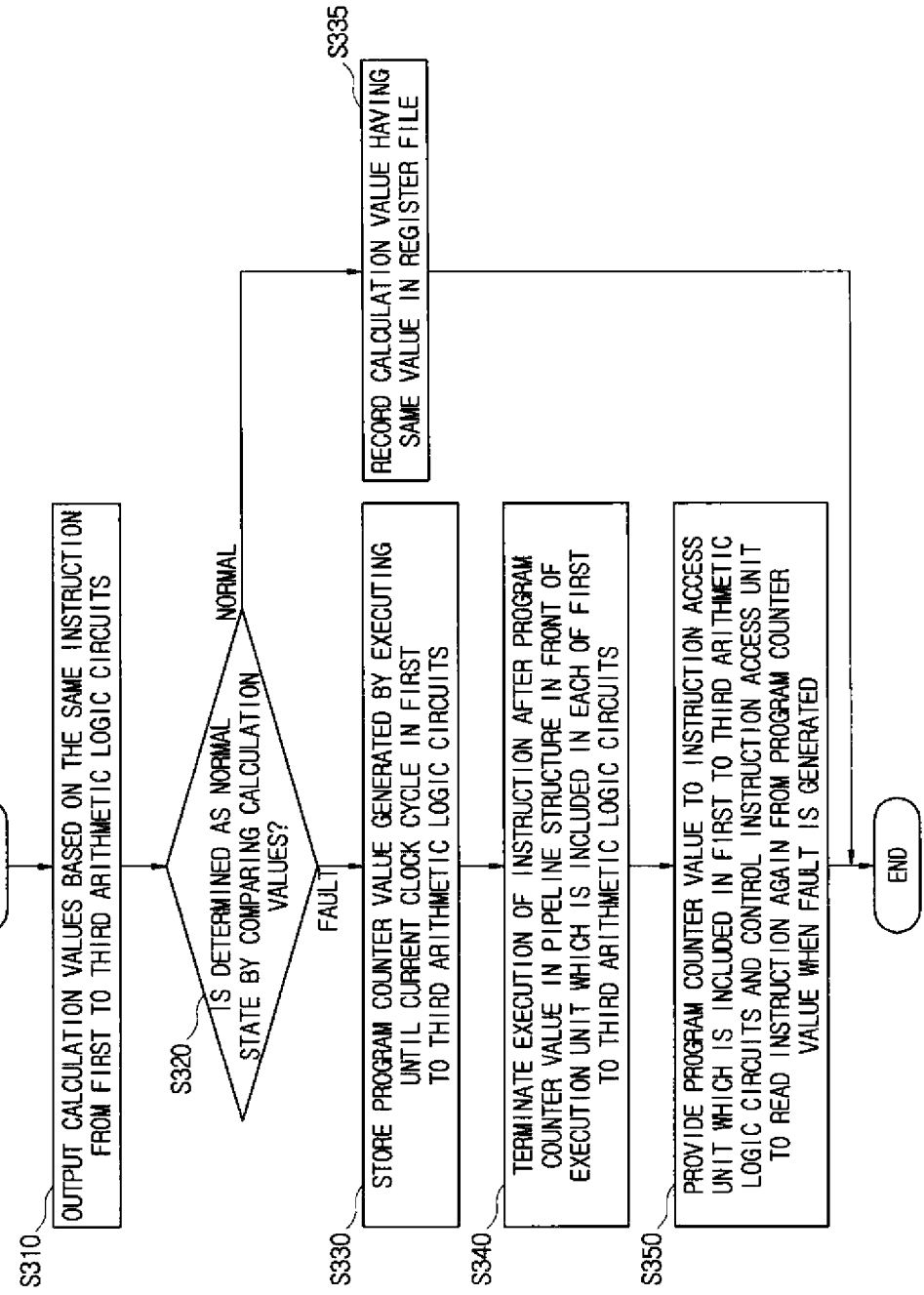
FIG. 3 is a flowchart for describing a control method of a recoverable and fault-tolerant CPU core according to one embodiment of the present invention.

FIG. 3 is a flowchart for describing a control method of a recoverable and fault-tolerant CPU core according to one embodiment of the present invention.

Referring to FIGS. 1 to 3, in operation S310, the first to third arithmetic logic circuits 110, 111, and 112 may receive the same instruction 100 from an instruction cache. Each of the first to third arithmetic logic circuits 110, 111, and 112 may perform a calculation requested by the same instruction, and output three calculation values 120, 121, and 122 as a result.

In operation S320, the first selector 130 may select the calculation value equal to at least another one among the calculation values 120, 121, and 122 output from the first to third arithmetic logic circuits 110, 111, and 112.

According to an embodiment of the present invention, the first selector 130 may compare the calculation values 120, 121, and 122 output from the first to third arithmetic logic circuits 110, 111, and 112, and the first selector 130 may determine that the CPU core is in a normal state when two or more of the calculation values are the same, and if not, may determine that the CPU core is in a fault state.

When determining that the CPU core is in the normal state, in operation S335, the first selector 130 may update the calculation value 151 having the same value in the register file 150.

When determining that the CPU core is in the fault state, in operation S330, the first to third arithmetic logic circuits 110, 111, and 112 may store a program counter value generated by executing until a current clock cycle according to the control of the fault controller 170.

In operation S340, each of the first to third arithmetic logic circuits 110, 111, and 112 may terminate an execution of an instruction after the program counter value in the pipeline structure in front of an execution unit (the first execution unit 320) which is included in each of the first to third arithmetic logic circuits 110, 111, and 112.

In operation S350, the first to third arithmetic logic circuits 110, 111, and 112 may provide the program counter value to the instruction access unit 310, and control the instruction access unit 310 to read an instruction again from the program counter value when the fault is generated.

Figure 4:
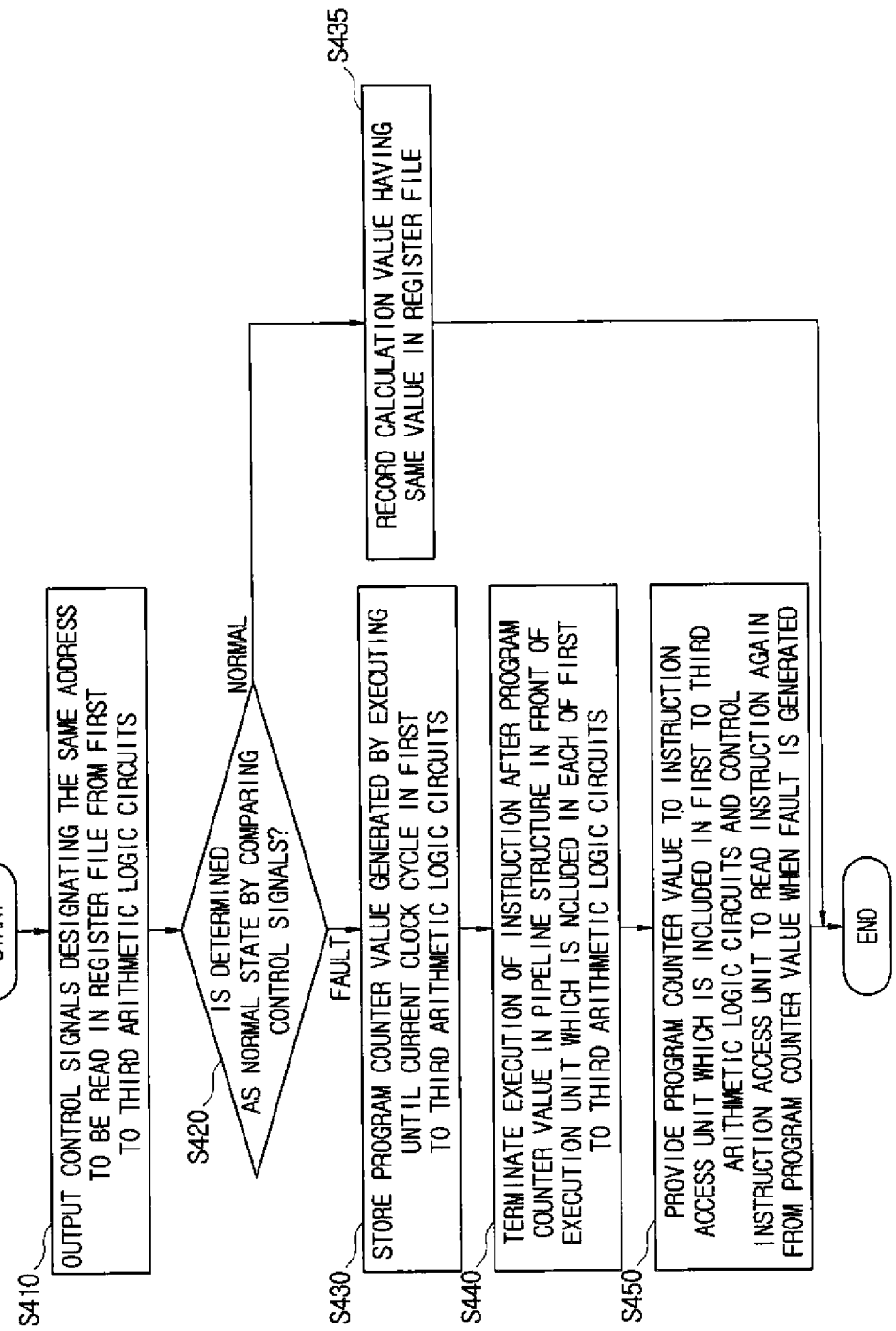
FIG. 4 is a flowchart for describing a control method of a recoverable and fault-tolerant CPU core according to another embodiment of the present invention.

FIG. 4 is a flowchart for describing a control method of a recoverable and fault-tolerant CPU core according to another embodiment of the present invention.

Referring to FIGS. 1 and 4, in operation S410, the first to third arithmetic logic circuits 110, 111, and 112 may output control signals 200, 201, and 202 designating an address of a register value to be read. At this time, the control signals 200, 201, and 202 may include information designating the same address to be read in the register file 150.

In operation S420, the second selector 140 may select the control signal equal to at least another one among the control signals 200, 201, and 202 output from the first to third arithmetic logic circuits 110, 111, and 112.

According to an embodiment of the present invention, the second selector 140 may compare the control signals 200, 201, and 202, and may determine that the CPU core is in a normal state when two or more of the control signals are the same, and if not, may determine that the CPU core is in a fault state.

When determining that the CPU core is in the normal state, in operation S435, the second selector 140 may output the control signal 155 having the same value to the register file 150. The register file 150 may read the register value 152 according to the control signal 155, and provide the read value to the first to third arithmetic logic circuits 110, 111, and 112.

When determining that the CPU core is in the fault state, in operation S430, the first to third arithmetic logic circuits 110, 111, and 112 may store the program counter value generated by executing until a current clock cycle according to the control of the fault controller 170.

In operation S440, each of the first to third arithmetic logic circuits 110, 111, and 112 may terminate an execution of an instruction after the program counter value in the pipeline structure in front of the execution unit (the first execution unit 320) which is included in each of the first to third arithmetic logic circuits 110, 111, and 112.

In operation S450, the first to third arithmetic logic circuits 110, 111, and 112 may provide the program counter value to the instruction access unit 310, and control the instruction access unit 310 to read an instruction again from the program counter value when the fault is generated.

According to the present invention described above, the first and second selectors used when reading and updating the register file may implement a fault-tolerant CPU core.

As one example, when any one arithmetic logic circuit among the first to third arithmetic logic circuits constructing the CPU core performs a malfunction due to external electrical factors, two among signals output from the first to third arithmetic logic circuits may be equal, and a remaining one may differ. Accordingly, the first and second selectors may select a signal having a normal value, and the CPU core may continuously perform a normal operation.

As another example, when two or more among the first to third arithmetic logic circuits perform a malfunction, the signals output from the first to third arithmetic logic circuits may differ. At this time, the CPU core may perform a micro flush operation, and terminate an execution of an instruction in which the fault is generated and an execution of an instruction after the fault is generated. After this, the CPU core may return to a state when the fault is generated, and perform an operation again while reading from the instruction of the time when the fault is generated. Accordingly, when the fault is generated, since the number of clock cycles consumed until returning to the normal state may be reduced compared with the conventional CPU core resetting every program which is being executed, availability may be increased.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A recoverable and fault-tolerant central processing unit (CPU) core, comprising:
    first, second, and third arithmetic logic circuits configured to perform a calculation requested by a same instruction;
    a first selector configured to compare calculation values output from the first, second, and third arithmetic logic circuits by the same instruction, determine as a normal state when two or more of the calculation values are the same, and if not, determine as a fault state;
    a register file configured to record a calculation value having the same value, when determining as the normal state in the first selector, and
    a second selector configured to compare control signals output from the first, second, and third arithmetic logic circuits, determine as a normal state when two or more of the control signals are the same, and if not, determine as a fault state, the control signal designating a same address to be read in the register file.

2. The recoverable and fault-tolerant CPU core of claim 1, wherein the first selector is connected to the register file through an update bus.

3. The recoverable and fault-tolerant CPU core of claim 1, further comprising a fault controller configured to control an operation of the first, second, and third arithmetic logic circuits when determining as the fault state in the first selector.

4. The recoverable and fault-tolerant CPU core of claim 3, wherein each of the first, second, and third arithmetic logic circuits comprises a program counter controller configured to store a program counter value generated by executing until a current clock cycle in the first, second, and third arithmetic logic circuits when receiving a fault signal indicating the fault state from the fault controller.

5. The recoverable and fault-tolerant CPU core of claim 4, wherein the program counter controller terminates an execution of an instruction after the program counter value in a pipeline structure in front of an execution unit which is included in each of the first, second, and third arithmetic logic circuits.

6. The recoverable and fault-tolerant CPU core of claim 4, wherein the program counter controller provides the program counter value to an instruction access unit which is included in each of the first, second, and third arithmetic logic circuits, and controls the instruction access unit to read an instruction again from the program counter value when a fault is generated.

7. The recoverable and fault-tolerant CPU core of claim 1, wherein each of the first, second, and third arithmetic logic circuits reads a register value from the register file according to the control signal having the same value when determining as the normal state in the second selector.

8. The recoverable and fault-tolerant CPU core of claim 1, further comprising a fault controller configured to control an operation of the first, second, and third arithmetic logic circuits when determining as the fault state in the second selector, and
wherein each of the first, second, and third arithmetic logic circuits comprises a program counter controller configured to store a program counter value generated by executing until a current clock cycle in the first, second, and third arithmetic logic circuits when receiving a fault signal indicating the fault state in the second selector from the fault controller.

9. The recoverable and fault-tolerant CPU core of claim 8, wherein the program counter controller terminates an execution of an instruction after the program counter value in a pipeline structure in front of an execution unit which is included in each of the first, second, and third arithmetic logic circuits.

10. The recoverable and fault-tolerant CPU core of claim 8, wherein the program counter controller provides the program counter value to an instruction access unit which is included in the first, second, and third arithmetic logic circuits, and controls the instruction access unit to read an instruction again from the program counter value when a fault is generated.

11. A control method of a central processing unit (CPU) core comprising first, second, and third arithmetic logic circuits, a register file, and a first selector configured to compare calculation values output by a same instruction from the first, second, and third arithmetic logic circuits, comprising:
comparing the calculation values output by the same instruction from the first, second, and third arithmetic logic circuits, determining as a normal state when two or more of the calculation values are the same, and if not, determining as a fault state;
recording a calculation value having the same value in the register file, when determining as the normal state, and
controlling an operation of the first, second, and third arithmetic logic circuits when determining as the fault state,
wherein the controlling of the operation comprises:

storing a program counter value generated by executing until a current clock cycle in the first, second, and third arithmetic logic circuits;
terminating an execution of an instruction after the program counter value in a pipeline structure in front of an execution unit which is included in each of the first, second, and third arithmetic logic circuits; and
providing the program counter value to an instruction access unit which is included in the first, second, and third arithmetic logic circuits, and controlling the instruction access unit to read an instruction again from the program counter value when a fault is generated.

12. A control method of a central processing unit (CPU) core comprising first, second, and third arithmetic logic circuits, a register file, and a second selector configured to compare control signals output from the first, second, and third arithmetic logic circuits, comprising:
comparing the control signals output from the first, second, and third arithmetic logic circuits, determining as a normal state when two or more of the control signals are the same, and if not, determining as a fault state; and
reading a register value from the register file according to a control signal having the same value in the register file, when determining as the normal state.

13. The control method of claim 12, further comprising:
controlling an operation of the first, second, and third arithmetic logic circuits when determining as the fault state, and
wherein the controlling of the operation comprises:
storing a program counter value generated by executing until a current clock cycle in the first, second, and third arithmetic logic circuits;
terminating an execution of an instruction after the program counter value in a pipeline structure in front of an execution unit which is included in each of the first, second, and third arithmetic logic circuits; and
providing the program counter value to an instruction access unit which is included in the first, second, and third arithmetic logic circuits, and controlling the instruction access unit to read an instruction again from the program counter value when a fault is generated.

14. The control method of claim 12, wherein the control signal designates a same address to be read in the register file.

* * * * *